United States Patent
Goemans et al.

(10) Patent No.: US 6,880,591 B2
(45) Date of Patent: Apr. 19, 2005

(54) CHARGING DEVICE

(75) Inventors: Piet Goemans, TT Zuidland (NL); Nico Tramper, GB Spijkenisse (NL)

(73) Assignee: Buchen-ICS B.V. (NL)

( * ) Notice: Subject to any disclaimer, the term of this patent is extended or adjusted under 35 U.S.C. 154(b) by 0 days.

(21) Appl. No.: 10/491,602

(22) PCT Filed: Oct. 23, 2003

(86) PCT No.: PCT/EP03/11752

§ 371 (c)(1),
(2), (4) Date: Apr. 1, 2004

(87) PCT Pub. No.: WO2004/037403

PCT Pub. Date: May 6, 2004

(65) Prior Publication Data

US 2004/0261898 A1 Dec. 30, 2004

(30) Foreign Application Priority Data

Oct. 25, 2002 (DE) .......................... 102 50 022

(51) Int. Cl.[7] ................................. B65B 1/04
(52) U.S. Cl. ................. 141/286; 141/237; 141/67; 414/303
(58) Field of Search ............... 141/67, 286, 234, 141/237; 414/299, 303; 422/232, 145, 219

(56) References Cited

U.S. PATENT DOCUMENTS

| 3,223,490 A | | 12/1965 | Sacken et al. |
| 3,788,370 A | * | 1/1974 | Hare et al. .................. 141/125 |
| 6,409,977 B1 | * | 6/2002 | Harper et al. ............... 422/232 |

FOREIGN PATENT DOCUMENTS

| DE | 36 01 366 C2 | 7/1987 |
| EP | 0 963 785 A1 | 12/1999 |

* cited by examiner

Primary Examiner—Steven O. Douglas
(74) Attorney, Agent, or Firm—Akerman Senterfitt

(57) ABSTRACT

The invention relates to a loading device (12) for a reactor formed by a plurality of vertically extending tubes (50). Said device is formed by loading elements (10) each of which comprises a circular plate (30) having two noses (16) formed thereon being positioned diametrically opposed to each other, and an opening (24) and a filling tube (26) the end side of which is formed around said opening (24) of said plate (30). The outer contours of said individual plates (30) are adapted to the reactor in such a manner that in case of a plurality of loading elements (10) being arranged side by side a parquet-like closed surface is formable when said filling tubes (26) extend through filling openings (25) into said tubes (50) of the reactor.

10 Claims, 3 Drawing Sheets

CHARGING DEVICE

Figure 1:
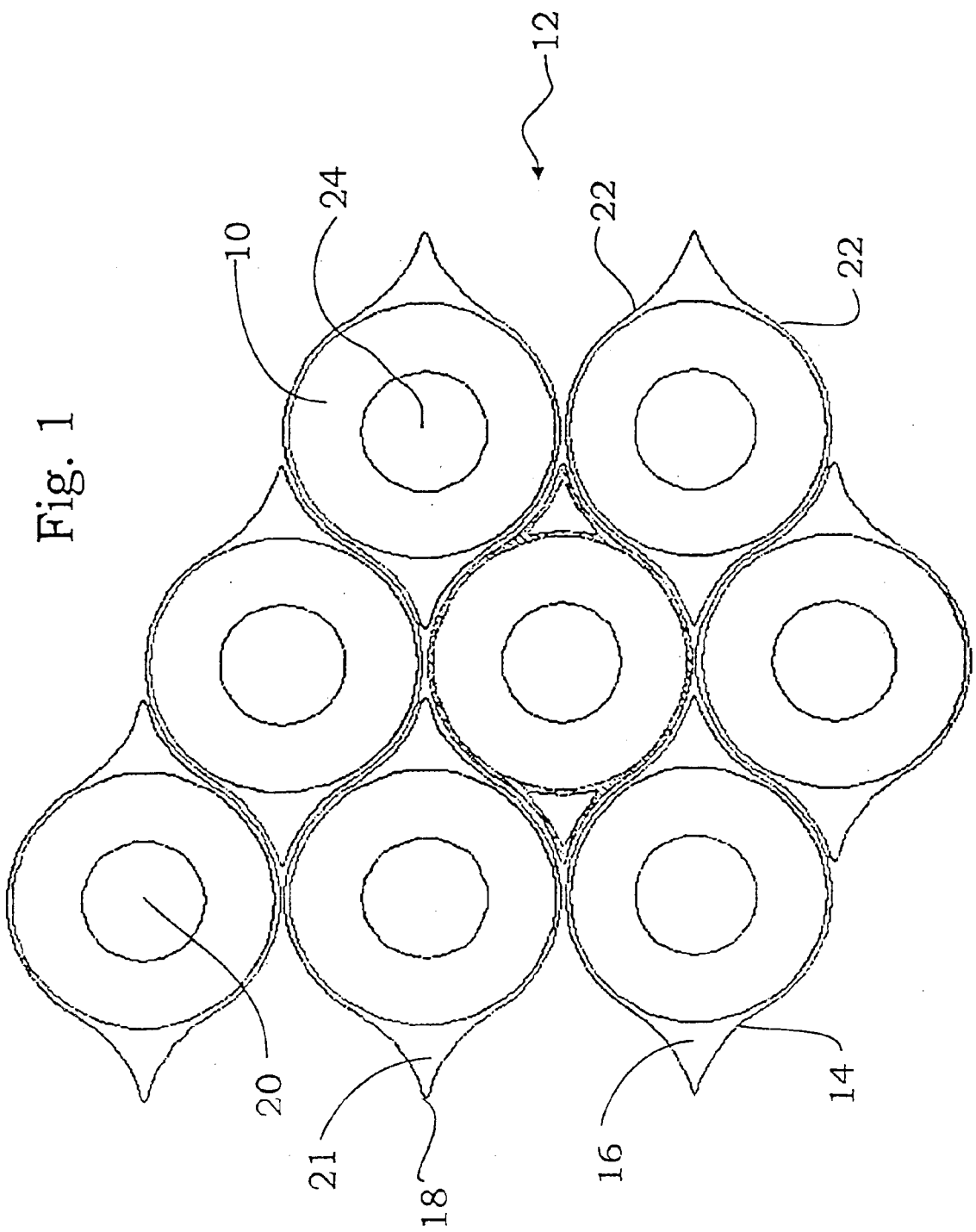

The present invention relates to a loading device for a reactor formed by a plurality of tubes which:
a) are arranged in an essentially vertical direction,
b) extend essentially parallel to one another,
c) each comprise a filling opening.

Such reactors are, for example, used as catalysts in catalytic processes occurring in the petrochemical industry. They consist of a plurality of vertically arranged tubes which are held together by one or several tube sheets to form a tube bundle or pack. These tubes are filled with a catalytically active material, mostly in the form of powder or granules through filling openings which are formed by open ends of the tubes. During operation, the tube bundle is closed gas-tight inter alia by a bell followed by leading the respective reaction gas into the bell and then through the filling openings through the tubes. The contents of the tubes, i.e. for example the granules, then make possible the desired reaction.

After a certain number of reactions, it is necessary to replace the contents of the tubes, i.e. the granules, and to refill the tubes. Care must be taken to ensure that the individual tubes receive the precise filling amount. Furthermore, any bridging between the granules must be avoided during the filling process. Bridging occurs when several granules pass the filling opening at the same time and get stuck against each other. This, in turn, causes an insufficient filling of the respective tube.

The simplest filling method is the separate filling of each individual tube. However, this is unacceptable due to the long filling time required.

Therefore, a large number of different methods and devices for fast and simple filling of granules into the tubes have been developed. For example, U.S. Pat. No. 3,223,490 discloses a filling device for a catalyst. This device consists essentially of a pan-like plate comprising a plurality of holes having diameters smaller than the filling openings through which the filling is performed. The plate is arranged above the tube ends of the reactor and is displaceable across a surface defined by the ends of all tubes. The distance between the holes in the plate is adapted to match the distance of the filling openings. It is thus possible to pour granules onto the plate and to fill several tubes simultaneously. In this case, the diameter of the holes is smaller than the diameter of the filling openings to avoid bridging. The device is relatively large and bulky which is especially disadvantageous when the reactor is of a gas-tight type. Prior to each filling process, the bell has to be removed in order to install the entire device. Further, expensive positioning is required to arrange the holes exactly above the filling openings.

On the other hand, EP-0 963 785 A1 shows a device formed of individual segments. These individual segments can be put by means of formed filling tubes onto the filling openings. A portion of each filling tube extends into each tube while the segments are supported by the tube ends. To provide sufficient support, the filling tubes are designed so as to be kept clamped in the tubes. To this end, they comprise ends tapering from the plate to their free ends and additional longitudinal slots. The diameter of the filling tubes is such that their free ends can easily be inserted into the tubes or their filling openings while then be clamped by sufficient pressure. The plates of the segments are designed accordingly and have dimensions adapted to the tubes so that they, when mounted adjacent to each other, form in their entirety a uniform surface like a parquet floor or penrose pattern. To this end, each of these segments has a polygonal plane surface. The special advantage of such segments is that they can be manufactured cost-effectively and be individually passed into the bell and inserted through a relatively small manhole when filling or refilling the tubes. No device according to U.S. Pat. No. 3,223,490 is required any more.

In spite of the aforementioned advantages, the system described in EP-0 963 785 A1 has a number of essential disadvantages. For instance, it is rather expensive to manufacture the formed parts mostly consisting of plastic material. The large number of edges and corners requires precise forming in order to ensure the surface-closing properties of the segments. In particular, the angles between the individual sides must be formed precisely. Even small deviations inhibit or at least complicate the surface-closing laying. This, in turn, imposes relatively high requirements to quality control of the segments produced making it time-consuming and expensive.

Further, the ratio between the conus angle of the filling tubes and the tube diameter as well as the width of the slots have to be precisely selected. On the one hand, the filling tubes must be held clamped inside the tubes while on the other they must be inserted into the tube so deeply that the horizontal surface of the segments facing the tube end abuts the tube end in order to be able to create a more or less uniform surface formed by a plurality of segments.

Another basic problem arises from the fact that the filling tubes are to be connected with an insert extending into the tubes to be filled. Then, this insert is to comprise the longitudinal slot. The problem is that, due to the mounting of the insert onto the segment itself, the longitudinal slot cannot be squashed any more in the portion next to the segment. This, in turn, prevents the segment or the insert from being inserted deeply enough into the tube. The possible depth of insertion depends upon the force acting onto the segment and/or onto the insert, as it becomes more and more difficult to squash the slot from the free end of the insert towards the segment. This, in turn, makes it very difficult to ensure a closed, even surface or depends very much upon the careful and smooth pressing action by the operator.

Due to the clamping of the polygonal plates and/or their inserts inside the tube ends, their later removal is rather difficult as well. Depending upon the force acting during insertion, it is very difficult to pull the filling tubes out of the tube ends.

Further, the squashing of the filling tubes or the longitudinal slot lets the material becoming tired and brittle in the course of time thus reducing the lifetime of the plates or segments.

Another problem becomes evident during the filling of the reactor through the loading elements or segments described. In their inserted state, they form a nearly sealed surface which means that dust accumulating on the loading elements can only be sucked off or enters the tubes, too. However, this is not desirable as the filling height of the tubes shall be defined only by the amount of catalyst itself or by the intact granules. So, if dust also enters the tubes, the amount of catalytic material inside the tubes will increase.

This problem cannot be finally solved by merely setting the smallest distance possible between the inserted polygonal segments. Due to the polygonal basic shape, especially due to the straight edges, the inevitable twisting of the segments during the filling process will at any rate shut the gaps. Although during the twisting of several segments in the same direction larger distances or gaps will occur near the corners, but they are fully closed along the straight edges. In the extreme case, this will create openings at the points where corners of the polygonal segments meet which are so wide that even uncrushed catalytic material may fall into these openings. This means that catalytic material remains unused and that the entire plant has to be most scrupulously cleaned after the filling process.

Another disadvantage is that, due to the polygonal basic surface, it is rather expensive to align the segments with one another, because the corners or tips result in open spaces between the segments which may be changed by all adjoining tips. It is basically difficult to close open spaces by means of segments or parts when their tips meet at only one defined point and have to be aligned with one another. This becomes the more difficult the more tips or corners meet at one point.

The straight edges of the polygonal segments may further form a blockade against the filling material. In a case when the segments are not precisely aligned in one plane, the straight edges of one segment will be project higher relative to the edges of the adjacent segment. When the filling material is then distributed, it is blocked by the higher edge and cannot arrive at the segment. These blocked granules block by themselves other granules thus creating a kind of damming effect considerably complicating the distribution of the filling material.

It is the object of the present invention to provide a loading device for a reactor comprising a plurality of tubes which device makes possible to load the reactor or the tubes as fast and simple as possible. It shall be possible to manufacture the loading device as simple and cost-effective as possible. Further, it is essential that the loading device is designed so that its improper use, for example by an inexperienced operator, is nearly excluded or at least minimised. It is essential as well that the loading device is suitable for gas-tight, closed reactors. The loading device shall be stable, heavy-duty and easy to remove.

According to the present invention, this object is achieved by a loading device for a reactor consisting of a plurality of tubes (50) being arranged essentially vertically, extend essentially parallel to one another, and each comprise a filling opening (25), which device consists of a plurality of loading elements, each element comprising 1) a plate, having
   1.1) a lateral outer contour formed by a circular shape with noses formed thereon and being diametrically opposed to each other, wherein said noses
      1.1.1) form tips arranged on an axis X—X extending through a centre of said circular shape,
      1.1.2) each form an isosceles triangle each of which is defined by two turning points in the outer contour of the circular shape and the respective tip and the sides of which have a uniform curvature towards a centre of the respective triangle.
   1.2) an opening,
2) a filling tube formed with its end side on the periphery of the opening of the plate, wherein the filling tube has a diameter smaller than the inner diameter of one of the tubes of the reactor, wherein the outer contours of the individual plates are adapted to the reactor so that in case of a plurality of loading elements arranged side by side an essentially closed surface resembling a parquet can be formed when the filling tubes extend through the filling openings into the tubes of the reactor.

Thus, the sides of the isosceles triangle bordering on the tip have a curvature the degree of which corresponds to the curvature of the circular shape.

It is an essential advantage of the present invention that a uniform surface can be formed by the loading elements without the necessity of aligning tips or corners with each other. Only circular segments nestle onto one another while the formed-on noses only close the spaces between the circular basic shapes. The laying or inserting of the loading elements is thus extremely simple and quickly to perform.

Due to the eye-shaped design of the plates according to the invention, a purposefully chosen gap between the loading elements cannot be closed even by twisting of individual loading elements. This results directly from the curved outer contours. Thus, dust can be safely removed even if the loading elements were twisted relative to one another. It has become evident that this advantage has a significant influence on the precise filling of the reactor tubes.

Further, the curved outer contours of the loading elements ensure that no blockades occur even when the loading elements were not exactly aligned in a horizontal plane. In contrast with the straight edges known from the prior art, the granules of the catalytic material are not stopped but deviated along the curvature. Thus, the disadvantageous formation of dams known from the prior art is avoided.

It is explicitly noted that the phrase "essentially closed surface" means that a certain gap is always present between the individual loading elements for dust removal, i.e. also when the loading elements are properly inserted into the tube ends.

The plate of the loading element comprises an opening which advantageously has a smaller diameter than the tubes to be filled. This narrowing of the cross-section has influence on the loading speed and the filling density of the tubes. With respect to these properties, this opening is particularly advantageous when the diameter of the opening amounts to approximately 70% of the diameter of the filling tube. This specification is to be understood merely as a guide number and may be adjusted to the respective situation and the granules to be filled in.

Further, the loading speed and the filling density are improved according to the invention by providing the plate with a funnel-like shape around the opening. Thus, the surface of the plate comprises a depression increasing towards the opening. The opening and the depression as well are preferably circular and coaxial with an axis extending at a right angle relative to the opening through the centre of the opening.

Thus, the loading device according to the invention comprises individual loading elements which are loosely inserted into the tubes or filling openings of the tubes of the reactor and form an essentially closed surface except gaps for dust removal. Thus, the loading elements do not comprise any clamping connection with the tubes.

It is further possible to gather several loading elements to form a single-piece component, so that this component comprises a plurality of openings and is designed so that, corresponding with the individual loading elements, it can be joined with other components or individual loading elements to form an essentially closed surface.

The invention provides further advantages compared with the prior art. The device shown in EP-0 963 785 A1 is namely also disadvantageous because, as a rule, the tubes of the reactors comprise welds extending along the tubes and projecting towards their interior. These may cause unwanted clamping and prevent the segments or their filling tubes from being fully inserted. At first sight, a longitudinal slot in the filling tube compensates for the narrowing of the cross-section caused by the weld, but, due to the missing flexibility of the filling tube, at its foot, i.e. next to the plate, a complete insertion is sometimes impossible. The only possibility to evade from this disadvantage is to insert the segment in such a manner that the weld is located in the region of the longitudinal slot. This, however, is also disadvantageous because a closed-surface arrangement can only be accomplished when the segments are aligned with one another; so it is not possible due to the disturbing welds to align individual segments in another way than the other segments.

A similar problem arises when the tube ends of the reactor do not protrude beyond a support plate but are directly welded to the latter. In case of reactors of this design, these annular welds often also project towards the interior of the tubes. The resulting problem is the same as the one described above and can also be solved by the loading elements according to the invention.

In order to prevent this disadvantageous collision with the weld, the filling tube according to the invention comprises at its exterior wall at least one, preferably three, projections protruding from the exterior wall which projections are distributed on the outer periphery and extend in the longitudinal direction of the filling tube. These projections protrude from the exterior wall of the filling tube so far that sufficient space is created between the exterior wall of the filling tube and the interior wall to receive the weld so that it cannot abut to the exterior wall of the filling tube. Unwanted clamping is thus prevented. When inserting the loading elements, care must only be taken to avoid collisions of the projections with the weld.

Here, too, an advantage of the shape of the plate or loading elements according to the invention becomes evident. Although the welds of the reactor tubes are basically more or less aligned in one direction, this alignment is not always precise, so that the position of the weld may vary by some degrees for example, care may be taken during the insertion of the first loading element that the weld is arranged at a maximum distance from the projections, i.e. in the middle between two projections, on the outer periphery of the loading element. Thus, the position of the welds of the following tubes may, provided that three projections are used, be offset by 60° in either direction relative to the first weld. If loading elements of the prior art, especially according to EP 0 963 785 B1, which have been provided with projections according to the invention, are used, the operator has a wide variety of different possibilities of inserting the loading element. If a projection collided with a weld, he/she must make another attempt during which a collision may occur again. In case of the design according to the invention, the operator has only two possibilities and thus faces a minor collision risk. If a collision occurred during the first insertion, the operator only has to rotate the loading element by 180° to exclude any further collision so that further failing attempts are impossible.

In an advantageous embodiment, the diameter of the filling tube in the region of its free end is smaller than at its base, i.e. in the region next to the plate. This facilitates the insertion into the filling opening of the tube.

In another embodiment of the present invention, the plate is provided with a side wall formed at its periphery and extending parallel to the filling tube towards the tube of the reactor. This side wall provides significant advantages over the prior art solutions. Namely, there is no more need for a clamping connection between the filling tube and the tube. Instead, the side wall supports on a support plate which holds the tubes of the reactor and through which the tube end portions with the filling openings extend.

In this case, the height of the side wall is chosen so as to compensate for tolerances of the tube ends extending through the upper support plate. This means that the upper edges of the tube ends do not abut to the interior wall of the plate. It has become evident that exactly these deviations caused considerable trouble during filling. The loading elements or segments of the prior art support on the upper edges of the tubes so that their vertical alignment depends upon the quality of the tube ends. When the tube ends are nut cut properly and even, differing heights and/or slanting positions of the loading elements may result which in turn cause projecting edges between the loading elements. This is prevented by the support of the side wall on the support plate extending horizontally according to the invention.

As explained above, height differences of the tube ends projecting above the support plate can also be compensated for by the selection of the proper height of the side wall. The support plate is the most suitable reference surface for supporting and/or for providing a uniform and essentially closed surface. Another advantage is that an operator may walk on the inserted loading elements which means that considerable forces act on the loading elements. The support by the side wall on the support plate ideally distributes these forces so that no unwanted clamping of the filling tubes in the tubes will occur. It is essential that the advantages provided by the side wall according to the invention are independent from the contour of the plate. This means that even the use of plates having prior art contours, for example polygonal plates, in combination with the side wall according to the invention provides an advantageous loading device.

The invention will now be explained in more detail by the following description of the drawings and the appended claims. The embodiment described is to be understood as merely exemplary without limiting the scope of the invention.

Figure 2:
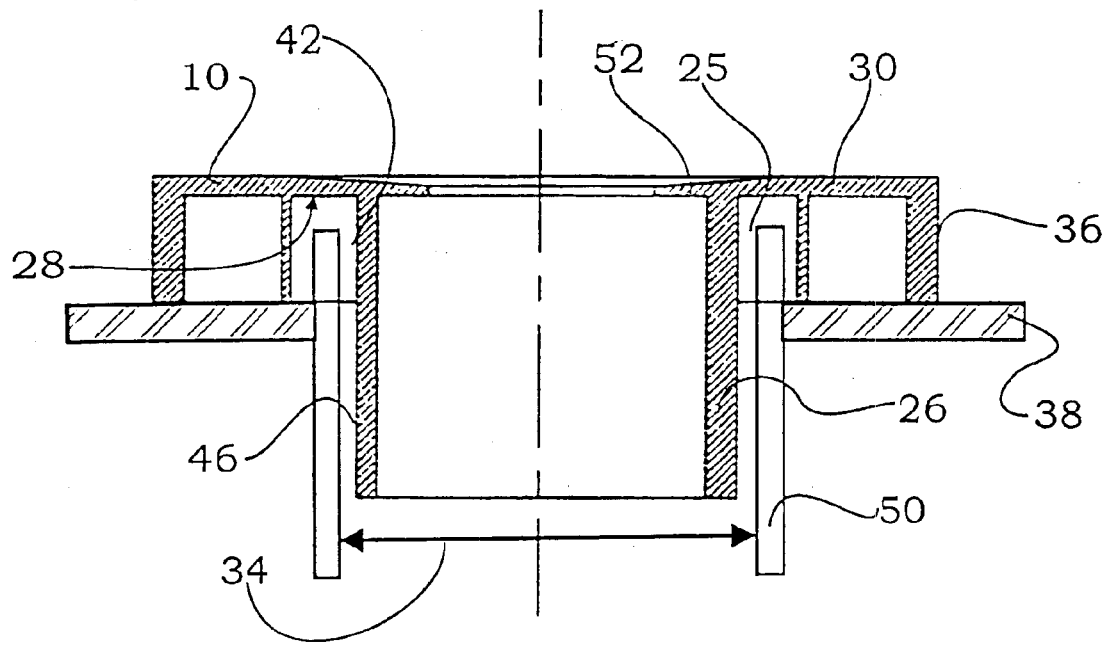
Figure 3:
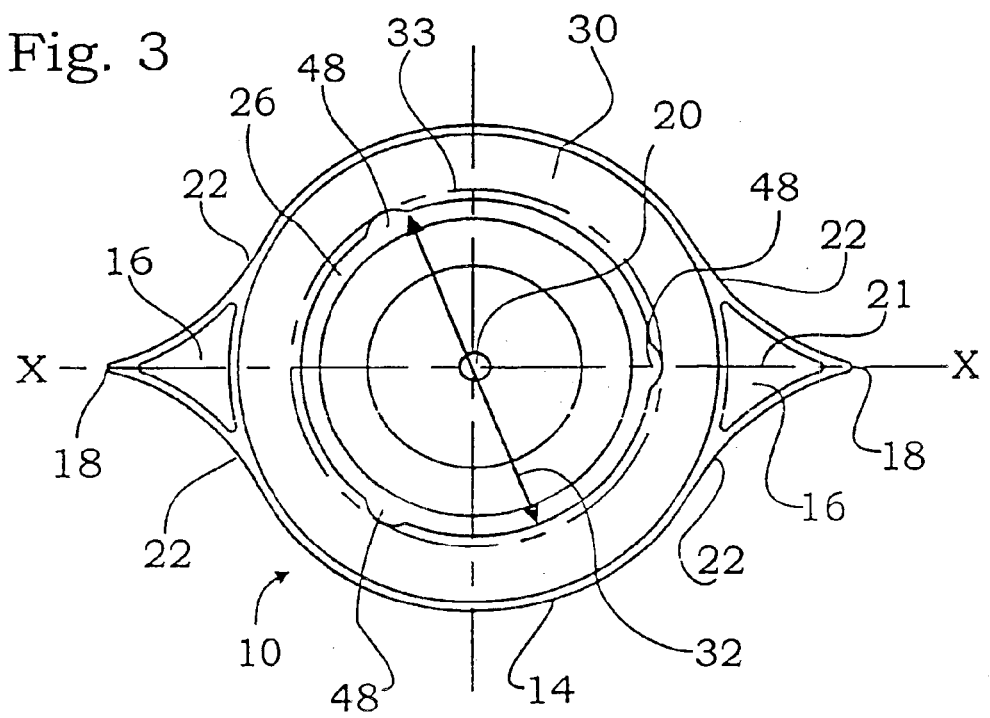
Figure 4:
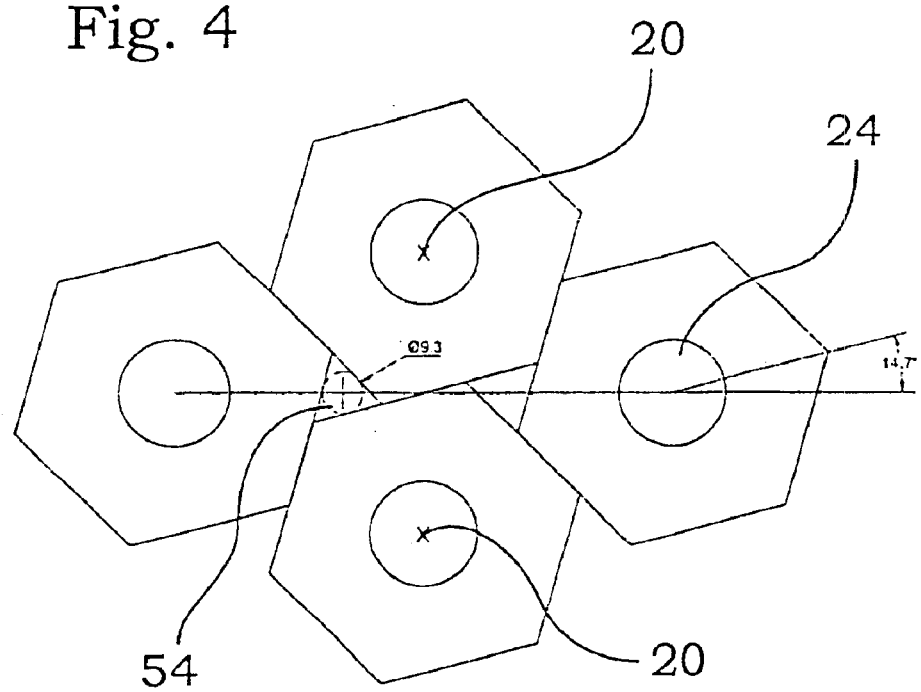
Figure 5:
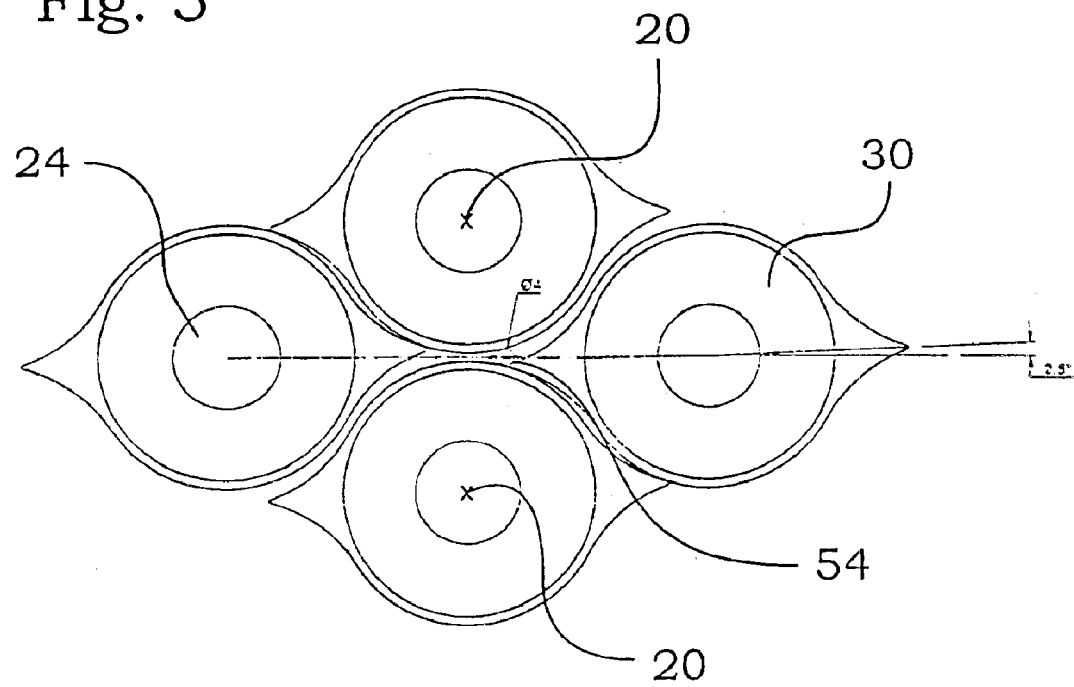

In the drawings,

FIG. 1 is a plan view of a loading device according to the invention comprising individual loading elements, FIG. 2 is a sectional view of a loading element according to the invention, FIG. 3 is a view of an individual loading element as seen from beneath, and FIG. 4 is a plan view of several segments twisted relative to one another of the prior art, FIG. 5 shows several loading elements twisted relative to one another according to the invention.

FIG. 1 illustrates how a loading device 12 comprising a uniform and essentially closed surface can be accomplished using loading elements 10 according to the invention. The individual loading elements 10 have as their basic shape a circular shape 14 from which noses 16 extend which are arranged diametrically opposed to each other and each of which comprises a tip 18.

The tips 18 are each positioned on an axis X—X (cf. FIG. 3) extending through a centre 20 of the circular shape 14. Starting from the circular shape 14, each of the two noses 16 originates from a turning point 22, respectively, to form isosceles triangles the sides of which have equal curvatures towards a centre 21 of the respective triangle.

When the loading elements 10 are arranged one behind the other or side by side in such a manner that their tips 18 are arranged on an axis X—X extending through the centres 20 of their respective circular shapes, further loading elements 10 the tips 18 of which are arranged on parallel axes X—X may nestle next to the former loading elements to form a uniform surface. Thus, the noses 16 are designed so that each single nose 16 closes one open space occurring between three circular shapes 14.

Further, it can be seen in FIG. 1 and FIG. 3 that the loading elements 10 comprise openings 24. In the inserted state of the loading elements 10, i.e. when they are inserted in rubes 50, these openings coincide with filling openings 25 of the tubes.

FIG. 2 shows the loading element 10 in its inserted state. The loading element 10 comprises a filling tube 26 which is formed on an interior side 28 of a plate 30 of the loading element 10 around the opening 24.

As further shown in FIG. 2, the plate 30 also comprises a side wall 36 extending parallel to the filling tube 26 towards the tube 50 to be filled. This side wall 36 supports on a support plate 38 of the reactor. The support plate 38 has the task of holding the tubes 50 of the reactor in their position. For this purpose, the end portions of the tubes 50 extend through openings in the support plate 38. In the embodiment shown, the end portions 42 of the tubes 50 project above the support plate 38.

FIG. 3 illustrates in a view of the loading element 10 from beneath that in an embodiment of the invention, the filling tube 26 comprises projections 48 extending in longitudinal direction on its exterior side 46. The projections 48 ensure that sufficient space is generated between the exterior side 46 of the filling tube 26 and an interior wall of the tube 50 to allow a possible weld present inside the tube 50 and narrowing the interior diameter 34 of the tube 50 to extend therein. The filling tube 26 has a minimum outer diameter 32 and a maximum outer diameter 33 (incl. the projections 48) which is smaller than an interior diameter 34 of a tube 50. Thus, any clamping of the filling tube 26 in the tube 50 is avoided.

Further, FIG. 3 illustrates (as can also be seen in FIG. 2) that the plate 30 is provided with a depression 52 near the opening 24 in a funnel-like manner, i.e. increasing towards the opening 24. This facilitates the filling of the tubes 50 and/or increases the filling speed.

The loading elements 10 are preferably made of plastic material but may consist of other suitable materials as well.

FIGS. 4 and 5 illustrate an essential advantage of the shape of the plates 30 according to the invention. In both figures, the centres 20 of the respective segments are spaced apart from each other by exactly the same amount. It is evident that the prior art segments are twistable relative to one another by a significantly higher amount (14.7°) than the plates 30 according to the invention (only 2.5°). This, in turn, results in the fact that openings may occur between the prior art segments through which, in the light of the predetermined dimensions, granules 54 having grain sizes up to 9.3 mm may pass. The maximum openings or gaps between the plates according to the invention allow only the passage of granules 54 having a grain size of about 4 mm. This difference provides significant advantages to the device according to the invention. The grain sizes of the catalyst often range between 4 and 9 mm which means that they may fall between the prior art segments. On the one hand, this enhances the need of cleaning after filling while on the other hand the catalytic material gets lost between the segments and does not arrive in the reactor tubes.

The invention is not limited to the embodiments shown and described but also covers all embodiments having the same effect in the sense of the invention. According to the invention, the plates may also be formed by multiples of the individual elements described. This means that it may be advantageous to not manufacture individual eye-like shapes or plates 30 but to gather 2, 3 or more plates 30 and to manufacture them in a single shape. Thus, the basic shape of such a multiple plate results from the individual plates 30 and may vary with respect to the number and arrangement of the individual plates 30. Such multiple plates comprise only one side wall 36 along the outer periphery and have the advantage of being more cost-effective to manufacture.

Further, the filling tubes 26 may comprise projections at the front sides of their free ends so that they do not rest on the support plate 38 with their entire front surfaces but only with their projections. This ensures that even in case of a dirty support plate 38 it is easier to form a plane of the plates 30. According to the invention, three projections are provided to prevent the loading elements 10 from wobbling.

What is claimed is:

1. A loading device (12) for a reactor formed by a plurality of tubes (50) which
   a) are aligned essentially vertically,
   b) extend essentially parallel to one another,
   c) each comprise a filling opening (25),
   comprising a plurality of loading elements (10) each of which comprises
   1) a plate (30) having
      1.1) a lateral outer contour defined by a circular shape (14) with noses (16) being arranged diametrically opposed to one another formed thereon, wherein said noses (16)
         1.1.1) form tips (18) being arranged on an axis (X—X) extending through a centre (20) of said circular shape (14),
         1.1.2) each form an isosceles triangle which is defined by two turning points (22) in the outer contour of said circular shape (14) and the respective tip (18) and the sides of which have an equal curvature towards a centre (21) of the respective triangle,
      1.2) an opening (24),
   2) a filling tube (26) the end side of which is formed around said opening (24) of said plate (30), wherein said filling pipe (26) has an outer diameter (32) which is smaller than the inner diameter (34) of a tube (50) of the reactor,
   wherein the outer contours of the individual plates (30) are adapted to the reactor in such a manner that in case of a plurality of loading elements (10) arranged side by side a parquet-like essentially closed surface is formable when said filling tubes (26) extend through the filling openings (25) into the tubes (50) of the reactor.

2. A loading device (12) according to claim 1, characterised in that said loading elements (10) comprise a multiple of individual plates (30) in such a manner that one loading element (10) comprises several openings (24) and accordingly several filling tubes (26).

3. A loading device (12) according to claim 1, characterised in that said filling tube (26) comprises on its exterior side (46) at least one projection (48) essentially extending in the longitudinal direction of said filling tube (26) wherein a maximum diameter (33) of said filling tube (26) is smaller than the inner diameter (34) of a tube (50) of the reactor.

4. A loading device (12) according to claim 1, characterised in that said plate (30) comprises in the region of said opening (24) on its side facing away from said filling tube (26) a funnel-like depression (52) becoming smaller towards said opening (24).

5. A loading device (12) according to claim 1, characterised in that said opening (24) has a smaller diameter than said filling opening (25) of the tube (50) to be filled.

6. A loading device (12) according to claim 1, characterised in that the outer diameter (32) of said filling tube (26)

decreases towards its free end in such a manner that is easily insertable into said filling opening (25) of said tube (50).

7. A loading device (12) according to claim 1, characterised in that a side wall (36) is formed on said plate (30) which side wall (36) extends more or less parallel to said filling tube (26) towards said tube (50) to be filled and has such a length that in the inserted state of said loading element (10) it supports on a support plate (38) of the reactor.

8. A loading device (12) for a reactor formed by a plurality of tubes (50) which
   a) are aligned essentially vertically,
   b) extend essentially parallel to one another,
   c) each comprise a filling opening (25),
   comprising a plurality of loading elements (10) each of which comprises
   1) a plate (30) having an opening (24),
   2) a filling tube (26) the end side of which is formed around said opening (24) of said plate (30), wherein said filling pipe (26) has an outer diameter (33) which is smaller than the inner diameter (34) of a tube (50) of the reactor,
   3) a side wall (36) formed on said plate (30) and extending more or less parallel to said filling tube (26) towards said tube (50) to be filled and has such a length that in the inserted state of said loading element (10) it supports on a support plate (38) of the reactor,
   wherein the outer contours of the individual plates (30) are adapted to the reactor in such a manner that in case of a plurality of loading elements (10) arranged side by side a parquet-like essentially closed surface is formable when said filling tubes (26) extend through the filling openings (25) into the tubes (50) of the reactor.

9. A loading device (12) according to claim 8, characterised in that said loading elements (10) are formed by a multiple of individual plates (30) in such a manner that one loading element (10) comprises several openings (24) and accordingly several filling tubes (26).

10. A loading device (12) according to claim 8, characterised in that said opening (24) has a smaller diameter than said filling opening (25) of said tube (50) to be filled.

* * * * *